(No Model.) 2 Sheets—Sheet 1.

G. T. PRATT.
AUTOMATIC SWITCH.

No. 585,890. Patented July 6, 1897.

WITNESSES:
F. Philip Farnsworth
D. H. Battles

INVENTOR
George T. Pratt,
BY Robinson Fisher
ATTORNEYS (No Model.) 2 Sheets—Sheet 2.

G. T. PRATT.
AUTOMATIC SWITCH.

No. 585,890. Patented July 6, 1897.

WITNESSES:
F. Philip Farnsworth
H. W. Battie

INVENTOR
George T. Pratt
BY
Robinson Fisher
ATTORNEYS

UNITED STATES PATENT OFFICE.

GEORGE T. PRATT, OF NEW HAVEN, CONNECTICUT.

AUTOMATIC SWITCH.

SPECIFICATION forming part of Letters Patent No. 585,890, dated July 6, 1897.

Application filed April 24, 1896. Serial No. 588,975. (No model.)

*To all whom it may concern:*

Be it known that I, GEORGE T. PRATT, a citizen of the United States, and a resident of the city and county of New Haven, in the State of Connecticut, have invented a new and useful Improvement in Automatic Switches for Electric and other Tramways, fully set forth in the following specification, taken in connection with the accompanying drawings, which form a part thereof, and in which similar letters of reference represent like parts in all figures.

Figure 1:
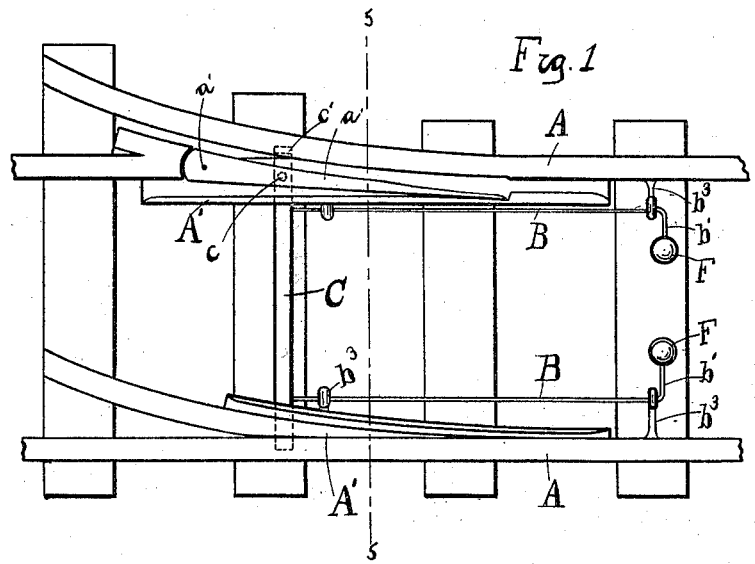
Figure 3:
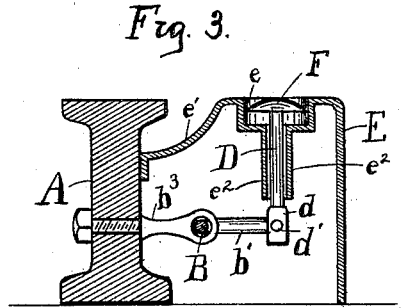
Figure 4:
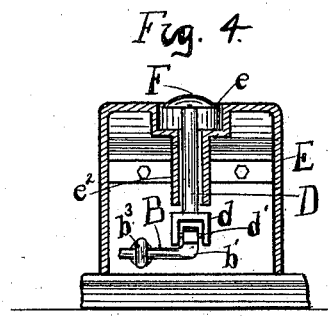
Figure 8:
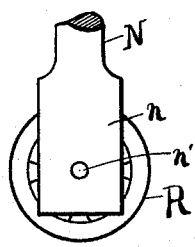
Figure 2:
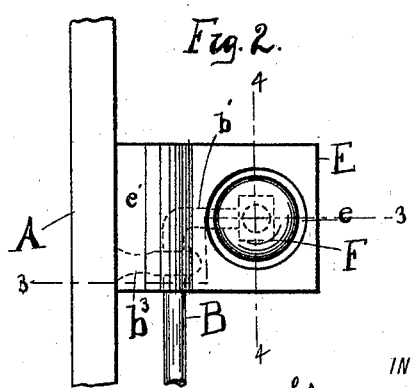
Figure 5:
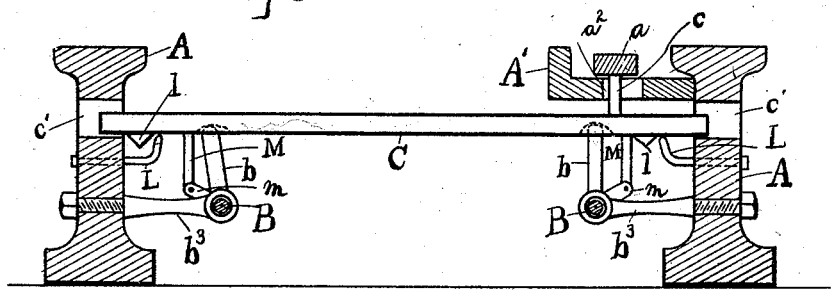
Figure 6:
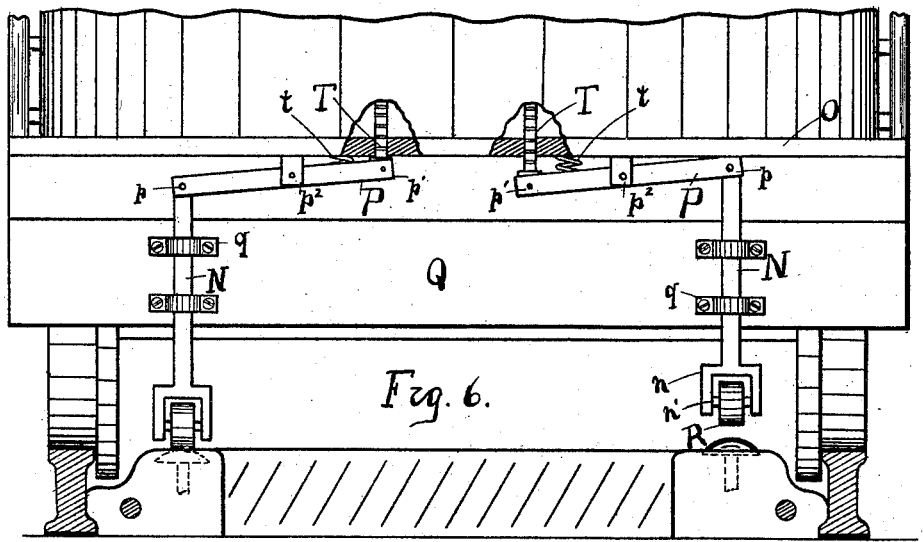
Figure 7:
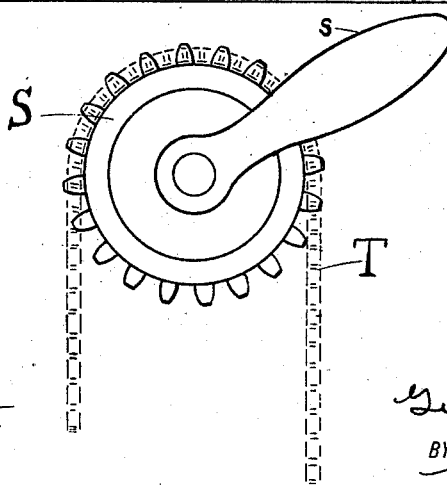

Figure 1 of the drawings represents a plan view of the switching mechanism with the housings omitted; Fig. 2, a top view of the housing for the plungers, plates, and associated parts; Fig. 3, a vertical section on lines 3 3 of Fig. 2; Fig. 4, a vertical section on lines 4 4 of Fig. 2; Fig. 5, an enlarged transverse vertical section on lines 5 5 of Fig. 1; Fig. 6, a front elevation of the operating mechanism beneath the platform of the car; Fig 7, a detail view in elevation of the sprocket wheel and chain; Fig. 8, a detail view of roller and attachment.

This invention applies to tramway-switches; and it consists more particularly of an automatic switch consisting of horizontal rods parallel to the track, having at one end vertical and at the other horizontal arms, the vertical arms attached to a cross-bar for throwing the switch and the horizontal arms to plungers operated by rollers or other devices connected to operating mechanism on the car.

The invention consists, further, in locking devices and other minor features described and claimed hereinafter.

Referring to the drawings for a more particular description, A represents the rails of the main track, and A' the frogs, while $a$ refers to the switch proper, pivoted to one or both of the frogs at $a'$.

Two horizontal rods or bars B lie near and parallel to the main rails A, as shown in Fig. 1, and are attached to said rails by means of eyebolts $b^3$ near their ends, in which they are capable of being rotated on their axes. One end of said rods B terminates beneath the frogs A', and to this end of the rods are secured (or formed integral therewith) vertical arms $b$, the upper ends of which are held in sockets in a cross-bar C, extending transverse to the rails A, which has bearings $c'$ therein of sufficient size to allow the cross-bar a longitudinal and slight transverse movement therein. A vertical stud $c$ extends upward from the cross-bar C (to which it is secured) through a transverse slot $a^2$ in the frog A' and into a socket in the under side of the switch $a$. A single switch is herein shown, but the invention may obviously be applied to a double switch by having vertical studs from the cross-bar C connected to both switches. The stud $c$ is connected to the switch $a$ some distance from the pivot $a'$, so that a slight longitudinal movement of the cross-bar C (being transverse to the track) will throw the switch in either direction. Such longitudinal movement is given to the cross-bar C by the vertical arm $b$ on the rod B as the rod is rotated, which is accomplished by the following mechanism: At the ends of the rods B farthest from the frogs A' are attached or formed integral therewith horizontal arms $b'$, extending at right angles therefrom a short distance, Figs. 1 and 2.

Vertical plungers D, having at their lower ends spreaders $d$, are attached to the arms $b'$ by means of bolts $d'$ passing through the spreaders $d$ and arms $b'$. The plungers D and arms $b'$ are inclosed in boxes or housings E, Figs. 2, 3, and 4, secured to the rails A in any convenient manner, as by screws, &c. The tops of the housings E are depressed, as at $e'$, near the rail, Fig. 3, to form a clearance for the flanges of the car-wheels, the remainder being on a level with the top of the rails. In the level portion of the tops are circular openings $e$, and in the interior of the box are vertical bearings $e^2$ for the vertical plunger D. Plates F, in shape like segments of spheres, are secured to the upper ends of the plungers D and are capable of a vertical movement in the circular openings $e$.

The operation is as follows: When the right-hand plate F is depressed, the plunger D, secured thereto, forces down the horizontal arm $b'$, which rotates the rod B and forces the vertical arm $b$ at the other end of the rod B toward the left, Fig. 5. As the upper end of the vertical arm is turned to the left the cross-bar C (to which it is connected) is forced to the left, and by means of the vertical stud $c$ in turn throws the switch to the left, leaving the right-hand track clear, Fig. 1. The movement of cross-bar C toward the left reverses the action of the left-hand rod, arms, and plunger, so that the plate F on the left of the track is raised ready for operation when the left-hand track is desired.

To prevent the accidental rebound of the switch when a plate and plunger are depressed too vigorously, a catch mechanism is provided at the ends of cross-bar C, which consists of a latch L and catch $l$. The catches $l$, which are V-shaped, Fig. 5, are on the under side of the cross-bar C, near the ends. The latches L, angular in shape, are secured at one end to the rails A beneath the cross-bar and are rounded at the other end. When the cross-bar is forced toward either rail, the catch slides over the end of the latch on that side and is held sufficiently to prevent the rebound of the switch.

Short arbors $m$ are secured to the horizontal rods B, adjacent to the vertical arms $b$ on the side nearest to the rails. Uprights M are pivoted to the free ends of the arbors $m$ and bear upon the under side of the cross-bar C. When the horizontal rods B are rotated, the one on the side locked by the catch (as the left side in Fig. 5) turns the arbor $m$ about its center, and as the free end describes its arc the upright M is raised vertically. The upright M, bearing on the under side of the cross-bar C, raises that end of the cross-bar sufficiently to allow the catch $l$ to slip over the latch L when the cross-bar is moved by the vertical arm $b$. As the catch is V-shaped and the end of the latch rounded, the slight lifting of the bar, together with the pressure of the vertical arm $b$ forcing the cross-bar toward the other side of the track, easily releases the engagement of the catch and latch. Housings or castings of suitable form may be used to cover and protect the horizontal rods, cross-bar, and other parts from contact with the pavement between the tracks, but are not shown in the drawings nor described herein.

The mechanism on the car for depressing the plates F and operating the switch may be as follows: Beneath the platform O of the car are pivoted at $p^2$, in any suitable manner, levers P. To the outer ends, Fig. 6, of the levers P are pivotally depended vertical rods N, running in bearings $q$ on the cross-beam Q in front of the wheels of the car. Spreaders $n$ on the lower ends of the rods N are adapted to hold, by means of bolts $n'$, wheels or rollers R. Affixed to the dashboard or other suitable place is a small sprocket-wheel S, with a handle $s$ for revolving the same. A chain T runs over the sprocket and has its two ends attached to the inner ends P' of the levers P, Fig. 6. When the sprocket-wheel is revolved in one direction or another, the chain lifts the inner end of one lever P while allowing the inner end of the other lever to be depressed by a spring $t$ between the inner end of each lever and the platform. When the inner end of a lever P is raised, the outer end is depressed and the roller or wheel R on the end depending therefrom is forced downward even with the top of the rails. Under the action of the spring $t$, lever P, and rod N the other roller R is forced upward clear of the track and ground. Turning the handle of the sprocket-wheel S to a vertical position brings both levers to a horizontal position, raising both rollers some few inches above the ground.

The operating of the switch by the mechanism on the car is as follows: When the switch is turned toward the left-hand rail, Fig. 1, leaving the right track clear, the plate on the left hand of the track is raised, as described above. In this raised position the plate projects above the top of the housing E, as shown in Fig. 4. By revolving the sprocket-wheel S by its handle $s$ the left-hand roller R may be depressed until it is flush with the top of the housing E and will roll upon and force the plate F downward, which, as hereinbefore shown, throws the switch over to the right, leaving the left-hand track clear. By the same depression of the plate F the left-hand end of the cross-bar C is raised and disengaged from its latch, and when the switch is in its proper position the right-hand end of the cross-bar C is locked by its catch $l$ engaging with the latch L on the right-hand rail. Any other suitable mechanism may be used on said car.

Having now described my invention, the details of construction of which may vary greatly without departing from the spirit thereof, what I claim, and desire to secure by Letters Patent, is—

1. In an automatic switch, the combination with the rails and the switch; of horizontal rods parallel to the rails and secured thereto, and adapted to rotate on their axes; a cross-bar connected to the switch; vertical arms to said rods attached to said cross-bar; horizontal arms at the other ends of said rods; vertical plungers connected to said horizontal arms; and plates secured to the upper ends of said plungers, substantially as described.

2. In an automatic switch, the combination with the rails and the switch; of a cross-bar extending transversely to and having bearings in the rails, said cross-bar having a stud connected to the switch; horizontal rods extending parallel and attached to said rails, and being capable of rotating on their axes; vertical arms to said rods attached to said cross-bar; horizontal arms to said rods; and vertical plungers connected to said horizontal arms substantially as described.

3. In an automatic switch, the combination with the rails and switch; of a cross-bar extending transversely to the rails and connected to the switch; V-shaped catches on the under side of said cross-bar; horizontal rods extending parallel to the rails, capable of being rotated on their axes; vertical and horizontal arms to said rods, said vertical arms being attached to said cross-bar; vertical plungers connected to said horizontal arms; and latches adapted to engage with said catches on the under side of said cross-bar, substantially as described.

4. In an automatic switch, the combination with the rails and switch; of a cross-bar extending transversely to the rails and connected to the switch; V-shaped catches on the under side of said cross-bar; horizontal rods extending parallel to the rails capable of rotating on their axes; vertical arms and arbors to said rods, said vertical arms being attached to said cross-bar; uprights pivoted to said arbors and bearing on the under side of said cross-bar; horizontal arms to said rods; vertical plungers attached to said horizontal arms; and latches adapted to engage with said catches on said cross-bar, substantially as described.

5. In an automatic switch, a locking device consisting of V-shaped catches depending from a cross-bar connected with the switch; latches rigidly secured to the rails of the track having vertical ends adapted to engage with said catches; and means for raising said cross-bar when it is moved longitudinally, substantially as described.

6. In an automatic switch, the combination with the switch; of a cross-bar connected therewith; V-shaped catches on the under side of said cross-bar; latches adapted to engage with said catches; arbors mounted to turn about a center; uprights pivoted to said arbors and bearing on the under side of said cross-bar; and means for operating said cross-bar and arbors, substantially as described.

In witness whereof I have hereunto set my hand this 23d day of April, A. D. 1896.

GEO. T. PRATT.

Witnesses:
F. PHILIP FARNSWORTH,
SAMUEL H. FISHER.